2,843,553
BLEND OF DEXTRAN-MODIFIED POLYESTER RESINS WITH METALLO-ORGANO COMPLEXES

Elwood P. Wenzelberger, Dayton, Ohio, assignor to The Commonwealth Engineering Company of Ohio, Dayton, Ohio, a corporation of Ohio No Drawing. Application January 17, 1955
Serial No. 482,414

4 Claims. (Cl. 260—17.4)

This invention relates to novel dextran-modified polyester resins incorporating metallo-organo complex compounds consisting of or formed from a drier metal compound, a phenol, and a nitrogenous compound.

Modified polyesters formed by interaction of an unsaturated polycarboxylic acid or functional derivative thereof, a polyhydric alcohol and dextran have certain important advantages, including the advantage that the dextran functions, to the extent of the proportion thereof present, to decrease the thermosetting property which is usually an inherent characteristic of polyester resins. Generally, it is found that most polyester or alkyd resins are settable in hardened condition in a commercially feasible period of time by curing or baking at elevated temperatures. The dextran-modified polyesters, on the other hand, are on the borderline between thermoplastic and thermosetting and may be hardened expeditiously by either heating or cooling, which appreciably extends their usefulness.

Depending on the alcohol component, the dextran-modified polyester may exhibit either more pronounced thermosetting or more pronounced thermoplastic property. Thus, those polyesters of which the alcohol component is glycerol or other alcohol of more than two hydroxyl groups are more definitely thermosetting and may be more expeditiously hardened by cooling. In general, the dextran-modified polyesters may be cooled and re-heated without ultimate hardening and setting more often than polyesters not modified by dextran.

It is now found that dextran-modified polyesters having incorporated therein, while in the resinous liquid state, a phenol-soluble complex resulting from the co-reaction of an oxide, hydroxide or salt of a polyvalent drier type metal, a phenol, and certain nitrogenous compounds, have still further advantages over simple polyester resins.

These metallo-organic complexes are known. They may be obtained by reacting the metal compound and a suitable nitrogen compound containing one or more nitrogen atoms having replaceable hydrogen attached thereto, in the presence of a phenol which enters into the reaction, to obtain complex reaction products as clear viscous liquids to resinous solids, which are compatible with the dextran-modified polyester and remain in solid solution therein when the latter is set in hardened condition by cooling or heating.

The metallo-organic complexes have been described and, as is known, the quantity of metallic compound entering into addition-reactions to form the complexes, as through co-ordinate valence bonds or hydrogen-bonding with nitrogenous compounds and phenol, varies depending on the different metals and their compounds as well as on the particular nitrogen compound and phenol used. Clear viscous complexes may contain as little as 1% and as high as 47% of the starting metal compound. Usually, the reaction of oximes, mono-alkyl primary amines, secondary and teritary amines and a phenol yields a clear liquid complex which contains only a small percentage of the original metal compound, while the use of ammonia, ammonium hydroxide, and saturated aliphatic nitrogen compounds having more than one $NH_2$ group such as urea and the alkylene polyamines like ethylene diamine, propylene diamine, diethylene triamine, 1,2,3-triaminopropane and, to lesser degree, the higher molecular weight polyamines like triethylene tetramine and tetraethylene pentamine tend to form complexes of liquid to solid consistency which contain the larger quantities of the starting metal compound.

Phenols which may be used in producing the complexes for incorporation with the dextran-modified polyesters include phenol; the simple phenol homologs like cresols and xylenols; alkyl-substituted phenols such as ethyl, butyl, amyl and octyl phenols; carboxy phenols such as the hydroxy benzoic acids and including salicylic and cresotic acids; halophenols, for example, 2,4-dichlorophenol, p-chlorophenol, and 2,4-dibromophenol; polycyclic phenols of the type of the naphthols and the phenyl phenols and polyhydroxy phenols like diphenylolpropane, hydroquinone, resorcinol and pyrogallol. Lower molecular weight monohydroxy phenols, e. g., phenol, cresol, butyl phenols and the like are generally preferred since those materials favor the production of complexes containing the larger amounts of the starting metal compound.

The metal compound is a polyvalent drier metal and may be a drier type metal having a principal valence of two, such as zinc, cadmium and lead. Compounds of metals having a minor valence of two, or only valences higher than two, such as iron, aluminum, and chronium may also be used.

The addition compounds in which the drier metal is zinc, cobalt, manganese, cadmium or lead and the nitrogen compound is ammonia, ammonium hydroxide, urea or a saturated alkylene polyamine free from reactive groups other than amino ($NH_2$) or imino ($NH$) may be preferred.

In producing the complexes, the phenol reactant may be used in a quantity at least approximately that which provides three or more phenolic hydroxyl groups per metal atom of the metal compound. The minimum proportion of nitrogen compound to be used varies. Mono-alkyl primary amines, secondary aliphatic amines and polyamines having only amino groups, such as 1,3-bis ethyl amine butane, are used in amounts of between 10 and 32 mols thereof per metal atom of the metal compound. More reactive or effective nitrogen compounds having a plurality of $NH_2$ groups, such as urea or the saturated alkylene polyamines free of reactive groups other than $NH_2$ or $NH$ may be satisfactory when used in a proportion supplying about three $NH_2$ groups per metal atom or three $NH_4OH$ molecules, in the case of ammonium hydroxide. The complexes are obtained by heating the metal compound, a phenol and the nitrogen compound under reflexing until the viscous to solid complex is formed.

The dextran polyester to be modified by blending with the metallic-organic complex is obtained by heating the unsaturated polycarboxylic acid or anhydride, polyhydric alcohol and dextran to polyester-forming temperature until a clear, resinous but flowable and homogeneous mass is obtained. Examples of the unsaturated polycarboxylic acids or derivatives which may be used include maleic, fumaric, phthalic, chlormaleic, chlorfumaric, citraconic, methylethyl maleic, diethyl maleic, chlormethyl maleic and mesaconic acids and the acid anhydrides. Useful polyhydric alcohols include ethylene glycol, di-, tri-, and tetramethylene glycol, propylene glycol, dipropylene glycol, glycerol, and pentaerythritol. Mixtures of the acids or derivatives and mixtures of the polyhydric alcohols may be used. The acid or anhydride and alcohol are selected so that, on heating polymerization is initiated.

The dextran may be the native, high molecular weight polysaccharide biosynthesized from sucrose by the action of microorganisms of the *Leuconostoc mesenterides* and *L. dextranicum* types or their enzymes, or a partial hydrolyzate of the native material. As is known, the properties of the dextrans vary with the microorganism or its enzyme used to effect the biosynthesis. The dextran combined with the polyester-forming ingredients may have a molecular structural repeating 1,6 to non-1,6 linkages ratio of 1.9:1 to 30:1, form stable aqueous solutions or dispersions of 0.5% to 50% concentration and have a molecular weight between about 2000 and that of native, microbiologically produced dextran. Mixtures of these dextrans may be used, such as a mixture of native *L. m.* B-512 dextran and native *L. m.* B-523 dextran, or a mixture of a native, high molecular weight dextran with a partial hydrolyzate of relatively low molecular weight.

The relative proportions of the components of the polyester may be varied and either the polycarboxylic acid or polyhydric alcohol may prodominate, the dextran being used, usually, in relatively minor amount. In general, the polyester is obtained by heating a mixture of, by weight, 30% to 75% of the polycarboxylic acid or anhydride thereof, 15% to 60% of the polyhydric alcohol and 5% to 25% of the dextran, to a total of 100%, at reaction temperatures of 50° C. to 300° C. until a clear homogeneous resinous liquid is obtained. The components may be mixed together directly or the dextran or a portion thereof may be dissolved or dispersed in the polyhydric alcohol with heating and the solution or dispersion added to the liquified acid or anhydride.

The reaction proceeds readily and a catalyst may not be required. However, a catalyst may be used and suitable catalysts include ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series such as benzoyl peroxide, p-chlorobenzoyl peroxide, etc., mixed organic peroxides such as acetyl benzoyl peroxide, ketone peroxides of the type of acetone peroxide, triacetone peroxide, alkyl derivatives of hydrogen peroxide including ethyl hydrogen peroxide, diethyl peroxide, various per compounds such as perborates, persulfates, perchloartes, etc., aluminum salts such as the halides, e. g., aluminum chloride. If a catalyst is used, benzoyl peroxide in a concentration of 0.1% to 1.5% by weight of the total charge is often preferred.

It may also be desirable to include a polymerization inhibitor in the composition. Antioxidants such as hydroquinone, pyrogallol, tanic acid or any aromatic amine such as aniline or phenylene diamine may be employed as the inhibitor, usually in amounts between 0.01% to 0.02% on the composition weight.

Pigments, dyes and special effect materials including metallic particles may also be included.

The dextran-modified polymerizable polyester is blended with the metallo-organic complex, either in the viscous fluid condition in which it is obtained initially, or after cooling thereof to hardened condition, with optional granulation, and re-heating to the flowable state.

The metallo-organic complexes are compatible with the dextran-modified polyesters in all proportions but, preferably, are blended with the polyester composition in amounts of 1% to 15% by weight. The incorporation of the metallo-organic complex with the dextran-modified polyester further enhances the property of the polyester conferred by the dextran of being capable of repeated cooling and heating without ultimate hardening and of retaining ductility and malleability under heating. The blends ultimately set in hardened condition but may be hot or cold worked satisfactorily without the ultimate setting taking place prematurely.

The following examples are given to illustrate specific embodiments of the invention, it being understood that these examples are not limitative.

Example I

A modified polyester is obtained by dissolving 14.3 parts of particulate *L. m.* B-512 dextran (average M. W. about 30,000) in 40.4 parts of hot glycerol, adding the hot solution to 45.3 parts of melted maleic anhydride, boiling the mass for 10–15 minutes with continuous stirring. About 50 parts of the resulting product is cooled to 50° C. and blended with 5 parts of a metallo-organic complex in the form of a clear amber viscous liquid obtained by heating a mixture of 5 grams cadmium oxide (CdO), 25 grams diethylene triamine and 70 grams of phenol ($C_6H_5OH$) to 150° C. with refluxing.

The resulting blend may be used as a heat-hardenable non-cracking electrical insulation coating for copper wire.

Example II

About 11.6 parts of particulate *L. m.* B-523 native dextran (average M. W. about 30,000) are dissolved in 52 parts of hot ethylene glycol and the hot solution is added to 36.4 parts of melted phthalic anhydride. The mass is boiled for 15 minutes with constant stirring to obtain a clear, homogeneous resinous liquid.

The dextran-modified polyester in the resinous viscous flowable condition is blended with 5% by weight of a metallo-organic complex obtained by heating 5 gms. of magnesium acetate, 25 grams of diethylene triamine and 70 grams of phenol to 150° C. with refluxing for 30 minutes.

Example III

A polyester is prepared by dissolving 11.6 parts of particulate *L. m.* B-512 dextran having a molecular weight of 20,000 to 200,000 (average 60,000 to 80,000) in 52 parts of hot ethylene glycol, adding the hot solution to 36.4 parts of melted maleic anhydride, and boiling the mass for 15 minutes. This product may be cooled to a hard clear amber resin, granulated and reheated to liquid fusible condition for blending with the metallo organic complex or it may simply be cooled down to 50–60° C. for the blending operation. In any case, it is blended with 1% by weight of a viscous, clear liquid complex obtained by heating a mixture of 87.4 grams of 2,4 dichlorophenol, 4.7 grams zinc oxide and 7.9 grams 1,3-bis-ethylamino butane at 150° C. for 30 minutes.

This flowable blend may be used as a protective insulative enamel for copper wire that is set to hard condition on the wire by cooling, but which is more resistant to heating than enamels comprising other thermoplastic resins.

Other blends obtained by mixing polyesters formed by the interaction of different polycarboxylic acids or their anhydrides, different polyhydric alcohols and different dextrans with different metallo-organic complexes formed from ingredients other than used in the examples but within the scope of this disclosed are similarly prepared and provide hard, heat-resistant coatings or films. Since the substitution of other dextran-modified polyesters and metallo-organic complexes, and other variations, may be made in practicing the invention without departing from its spirit and scope, it is to be understood that it is not intended to limit the invention except as it is defined in the appended claims.

What is claimed is:

1. As a new composition of matter, a blend of (I) a polyester resin obtained by mixing from 30 to 75% by weight of a substance selected from the group consisting of unsaturated polycarboxylic acids and anhydrides thereof, 15 to 60% by weight of a polyhydric alcohol selected from the group consisting of glycerol and ethylene glycol, and 5 to 25% by weight of a dextran, and heating the resultant mixture at a temperature of 50° C. to 300° C. until a clear, resinous liquid reaction product is produced, and (II) a metallo-organic complex obtained by reacting at 150° C. (a) 4.7% to 5.0% by weight of a compound from the group consisting of oxides, hydroxides and salts of a metal from the group consisting of zinc, cadmium, magnesium and lead, (b) 70% to 87.4% by weight of a phenol, and (c) 7.9% to 25% by weight of a nitrogen-containing compound of the group consisting of ammonia, ammonium hydroxide and alkylene polyamines.

2. As a new composition of matter, a blend of (I) a polyester resin obtained by mixing from 30 to 75% by weight of a substance selected from the group consisting of unsaturated polycarboxylic acids and anhydrides thereof, 15 to 60% by weight of a polyhydric alcohol selected from the group consisting of glycerol and ethylene glycol, and 5 to 25% by weight of a dextran, and heating the resultant mixture at a temperature of 50° C. to 300° C. until a clear, resinous liquid reaction product is produced, and (II) a metallo organic complex obtained by reacting at 150° C. (a) 5% by weight of cadmium oxide, (b) 70% by weight of a phenol and 25% by weight of diethylene triamine.

3. As a new composition of batter, a blend of (I) a polyester resin obtained by mixing from 30 to 75% by weight of a substance selected from the group consisting of unsaturated polycarboxylic acids and anhydrides thereof, 15 to 60% by weight of a polyhydric alcohol selected from the group consisting of glycerol and ethylene glycol, and 5 to 25% by weight of a dextran, and heating the resultant mixture at a temperature of 50° C. to 300° C. until a clear, resinous liquid reaction product is produced, and (II) a metallo organic complex obtained by reacting at 150° C. (a) 5% by weight of magnesium acetate, (b) 70% by weight of a phenol and (C) 25% by weight of diethylene triamine.

4. As a new composition of matter, a blend of (I) a polyester resin obtained by mixing from 30 to 75% by weight of a substance selected from the group consisting of unsaturated polycarboxylic acids and anhydrides thereof, 15 to 60% by weight of a polyhydric alcohol selected from the group consisting of glycerol and ethylene glycol, and 5 to 25% by weight of a dextran, and heating the resultant mixture at a temperature of 50° C. to 300° C. until a clear, resinous liquid reaction product is produced, and (II) a metallo organic complex obtained by reacting at 150° C. (a) 4.7% by weight of zinc oxide, (b) 87.4% by weight of dichlorophenol and (c) 7.9% by weight of bis-ethylamino butane.

References Cited in the file of this patent

UNITED STATES PATENTS

| | | |
|---|---|---|
| 1,108,329 | Callahan | Aug. 25, 1914 |
| 2,624,768 | Toulmin | Jan. 6, 1953 |